United States Patent
Qi et al.

(10) Patent No.: US 12,195,213 B2
(45) Date of Patent: Jan. 14, 2025

(54) ENERGY SELF-CONTROL BASE STATION FOR BATTERY REPLACEMENT BASED ON SOLAR POWER SUPPLY WITH INDEPENDENT UAV TAKE-OFF AND LANDING

(71) Applicant: INNER MONGOLIA UNIVERSITY OF TECHNOLOGY, Inner Mongolia (CN)

(72) Inventors: Yongsheng Qi, Inner Mongolia (CN); Anyu Chen, Inner Mongolia (CN); Yongting Li, Inner Mongolia (CN); Liqiang Liu, Inner Mongolia (CN); Songsong Zhang, Inner Mongolia (CN)

(73) Assignee: INNER MONGOLIA UNIVERSITY OF TECHNOLOGY, Hohhot (CN)

( * ) Notice: Subject to any disclaimer, the term of this patent is extended or adjusted under 35 U.S.C. 154(b) by 0 days.

(21) Appl. No.: 18/015,321

(22) PCT Filed: Jul. 7, 2020

(86) PCT No.: PCT/CN2020/100688
§ 371 (c)(1),
(2) Date: Jan. 9, 2023

(87) PCT Pub. No.: WO2021/068576
PCT Pub. Date: Apr. 15, 2021

(65) Prior Publication Data
US 2024/0228077 A1    Jul. 11, 2024

(30) Foreign Application Priority Data
Oct. 12, 2019  (CN) .......................... 201910968766.1

(51) Int. Cl.
*B64U 50/39* (2023.01)
*B60L 53/51* (2019.01)
(Continued)

(52) U.S. Cl.
CPC .............. *B64U 50/39* (2023.01); *B60L 53/51* (2019.02); *B60L 53/80* (2019.02); *B64U 70/97* (2023.01); *B60L 2200/10* (2013.01)

(58) Field of Classification Search
CPC ........ B64U 50/39; B64U 70/97; B64U 50/19; B60L 53/51; B60L 53/80; B60L 2200/10;
(Continued)

(56) References Cited

U.S. PATENT DOCUMENTS 2,939,657 A * 6/1960 Westcott, Jr. ............. B64F 1/36
114/261
4,236,686 A * 12/1980 Barthelme ................ B64F 1/00
244/116
(Continued)

FOREIGN PATENT DOCUMENTS

| CN | 1901252 A | 1/2007 |
| CN | 104134774 A | 11/2014 |
(Continued)

OTHER PUBLICATIONS

Notification to Grant Patent Right for Invention, Chinese Application No. 201910968766.1, mailed Dec. 28, 2022 (3 pages).
(Continued)

*Primary Examiner* — Medhat Badawi

(57) ABSTRACT

The invention discloses an energy self-control base station for battery replacement based on solar power supply with independent UAV take-off and landing, which comprises a UAV take-off and landing device, an automatic battery replacement device and an energy supply device. The foldable solar panel structure is driven by a motor. The invention has simple structure and is convenient for automatic battery replacement. The UAV damage caused by UAV position deviation is effectively avoided when the platform descends. The invention adopts an electric mechanical claw to cooperate with a liftable battery compartment, so as to automati-
(Continued)

cally replace UAV batteries. After the electric mechanical claw is aligned with the predetermined position, the batteries can be grasped and placed by lifting the battery compartment or the annular lifting platform, which simplifies the mechanical structure of the automatic battery replacement device.

7 Claims, 8 Drawing Sheets

(51) Int. Cl.
*B60L 53/80* (2019.01)
*B64U 70/97* (2023.01)

(58) Field of Classification Search
CPC ..... Y02T 10/70; Y02T 10/7072; Y02T 90/12; B64F 1/00; B60S 5/06
See application file for complete search history.

(56) References Cited

U.S. PATENT DOCUMENTS

| | | | | |
|---|---|---|---|---|
| 4,523,729 A * | 6/1985 | Frick | | B64F 1/04 244/135 A |
| 7,318,564 B1 * | 1/2008 | Marshall | | B60L 53/11 244/12.3 |
| 8,245,370 B2 * | 8/2012 | Ritter | | B64G 1/646 24/664 |
| 8,418,959 B2 * | 4/2013 | Kang | | B64U 70/97 244/116 |
| 8,511,606 B1 * | 8/2013 | Lutke | | B64U 50/38 320/109 |
| 9,139,310 B1 * | 9/2015 | Wang | | B60L 58/12 |
| 9,387,940 B2 * | 7/2016 | Godzdanker | | B64F 1/125 |
| 9,481,458 B2 * | 11/2016 | Casado | | B60L 58/10 |
| 9,545,852 B2 * | 1/2017 | Streett | | H02J 7/35 |
| 9,862,285 B2 * | 1/2018 | Lee | | B64U 30/20 |
| 9,873,524 B2 * | 1/2018 | Fisher | | B64U 10/20 |
| 9,902,504 B2 * | 2/2018 | Moore | | H01F 38/14 |
| 10,040,578 B2 * | 8/2018 | Miller | | B64F 1/36 |
| 10,131,437 B1 * | 11/2018 | Hanlon | | B65D 5/4233 |
| 10,196,155 B2 * | 2/2019 | Martin | | A47G 29/14 |
| 10,207,820 B2 * | 2/2019 | Sullivan | | B64U 80/25 |
| 10,315,761 B2 * | 6/2019 | Mccullough | | B64C 29/02 |
| 10,336,469 B2 * | 7/2019 | Mallinson | | A63F 7/20 |
| 10,336,470 B2 * | 7/2019 | Fisher | | B64F 1/02 |
| 10,357,709 B2 * | 7/2019 | Mallinson | | G05D 1/0038 |
| 10,369,975 B2 * | 8/2019 | Wang | | B60L 53/80 |
| 10,377,507 B2 * | 8/2019 | Tremblay | | B64F 1/20 |
| 10,407,182 B1 * | 9/2019 | Alcorn | | B64F 1/362 |
| 10,410,320 B2 * | 9/2019 | Taylor | | G05D 1/102 |
| 10,453,348 B2 * | 10/2019 | Speasl | | G06Q 10/08 |
| 10,457,421 B2 * | 10/2019 | O'Toole | | B60L 53/80 |
| 10,526,094 B2 * | 1/2020 | Cheng | | B64U 80/70 |
| 10,571,930 B2 * | 2/2020 | Coleman | | B60W 30/18009 |
| 10,571,933 B2 * | 2/2020 | Russell | | G08G 5/045 |
| 10,577,099 B2 * | 3/2020 | Akens | | B64U 50/34 |
| 10,633,115 B2 * | 4/2020 | Pilskalns | | B64U 80/30 |
| 10,839,699 B2 * | 11/2020 | Hardee | | G08G 5/006 |
| 10,913,546 B2 * | 2/2021 | Krauss | | B64F 1/18 |
| 10,953,999 B2 * | 3/2021 | Alcorn | | B64F 1/125 |
| 11,011,066 B2 * | 5/2021 | Ben-David | | G05D 1/106 |
| 11,091,043 B2 * | 8/2021 | Wang | | B64F 1/362 |
| 11,130,570 B2 * | 9/2021 | Green | | B64U 10/13 |
| 11,148,805 B2 * | 10/2021 | Cooper | | B64U 80/25 |
| 11,174,025 B2 * | 11/2021 | Green | | B64D 1/22 |
| 11,174,027 B2 * | 11/2021 | Martens | | B64F 1/125 |
| 11,180,263 B2 * | 11/2021 | Ratajczak | | G05D 1/101 |
| 11,198,519 B1 * | 12/2021 | Seeley | | B64F 1/002 |
| 11,332,033 B2 * | 5/2022 | Wang | | B64F 1/18 |
| 11,338,911 B2 * | 5/2022 | Wong | | B64C 25/68 |
| 11,413,978 B2 * | 8/2022 | Johnson | | B60L 53/66 |
| 11,440,679 B2 * | 9/2022 | Cowden | | B64U 70/30 |
| 11,453,498 B2 * | 9/2022 | Martens | | B64F 1/32 |
| 11,465,776 B2 * | 10/2022 | Smith | | B64C 25/001 |
| 11,636,771 B2 * | 4/2023 | Barker | | B60L 53/80 701/16 |
| 11,655,048 B2 * | 5/2023 | Sugimoto | | B64U 70/90 244/114 R |
| 11,667,402 B2 * | 6/2023 | Liske | | B64U 10/14 244/116 |
| 11,679,875 B2 * | 6/2023 | Abdellatif | | B64U 10/13 244/17.11 |
| 11,713,120 B2 * | 8/2023 | Tsugawa | | B64D 45/00 701/15 |
| 11,738,867 B2 * | 8/2023 | Ehasoo | | B60L 5/38 244/17.11 |
| 11,745,875 B2 * | 9/2023 | Ballerini | | B64D 45/04 244/110 E |
| 11,748,688 B2 * | 9/2023 | Ur | | B64C 39/024 705/332 |
| 11,767,129 B2 * | 9/2023 | Warwick | | B64F 1/007 244/137.1 |
| 11,780,606 B2 * | 10/2023 | Carthew | | B64U 70/93 244/114 R |
| 11,794,922 B1 * | 10/2023 | Twyford | | B64U 80/86 |
| 11,807,130 B2 * | 11/2023 | Livingston | | B60L 53/80 |
| 11,813,950 B2 * | 11/2023 | O'Brien | | B64U 80/40 |
| 11,820,507 B2 * | 11/2023 | Raptopoulos | | G08G 5/025 |
| 11,884,422 B2 * | 1/2024 | Lowe | | B64F 1/007 |
| 11,912,408 B2 * | 2/2024 | Falk-Petersen | | B64U 80/40 |
| 11,926,412 B2 * | 3/2024 | Waters | | H02J 7/0048 |
| 12,006,159 B2 * | 6/2024 | X | | B64U 80/40 |
| 12,017,553 B2 * | 6/2024 | Lowe | | B64U 80/70 |
| 12,020,582 B2 * | 6/2024 | Barker | | B64F 1/222 |
| 12,030,399 B2 * | 7/2024 | Berthelet | | B60L 53/10 |
| 12,037,135 B2 * | 7/2024 | Fisher | | B64F 1/222 |
| 12,037,137 B2 * | 7/2024 | Ratajczak | | B64F 1/32 |
| 2015/0158598 A1 * | 6/2015 | You | | G05D 1/0038 701/16 |
| 2016/0107531 A1 | 4/2016 | Ge et al. | | |
| 2016/0144982 A1 * | 5/2016 | Sugumaran | | B64F 1/005 244/108 |
| 2017/0217323 A1 * | 8/2017 | Antonini | | B60L 53/14 |
| 2017/0316701 A1 * | 11/2017 | Gil | | B60P 3/11 |
| 2017/0320572 A1 * | 11/2017 | High | | G05D 1/0011 |
| 2017/0327091 A1 * | 11/2017 | Capizzo | | H01M 10/30 |
| 2018/0079531 A1 * | 3/2018 | Bennett | | B64F 5/30 |
| 2019/0002127 A1 * | 1/2019 | Straus | | B64U 80/10 |
| 2019/0023416 A1 * | 1/2019 | Borko | | B65G 1/0485 |
| 2019/0061944 A1 * | 2/2019 | Zvara | | B64D 1/08 |
| 2019/0100307 A1 * | 4/2019 | Beltman | | G05D 1/0669 |
| 2019/0161190 A1 * | 5/2019 | Gil | | G01S 19/15 |
| 2019/0182415 A1 * | 6/2019 | Sivan | | G06F 3/013 |
| 2019/0270526 A1 * | 9/2019 | Hehn | | B64U 80/70 |
| 2019/0291865 A1 * | 9/2019 | O'Donnell | | B65D 25/101 |
| 2020/0031472 A1 * | 1/2020 | Martens | | B64D 1/22 |
| 2020/0031473 A1 * | 1/2020 | Martens | | B64F 1/32 |
| 2021/0107682 A1 * | 4/2021 | Kozlenko | | B64D 45/08 |
| 2021/0107684 A1 * | 4/2021 | Le Lann | | B60L 53/52 |
| 2021/0197983 A1 * | 7/2021 | Wang | | B64F 1/222 |
| 2022/0019247 A1 * | 1/2022 | Dayan | | B64F 1/222 |
| 2022/0169400 A1 * | 6/2022 | Seeley | | B64F 1/322 |
| 2024/0228077 A1 * | 7/2024 | Qi | | B60L 53/51 |

FOREIGN PATENT DOCUMENTS

| | | |
|---|---|---|
| CN | 105951614 A | 9/2016 |
| CN | 105981258 A | 9/2016 |
| CN | 106143941 A | 11/2016 |
| CN | 206939104 U | 1/2018 |
| CN | 207759063 U | 8/2018 |
| CN | 108656977 A | 10/2018 |
| CN | 108791929 A | 11/2018 |
| CN | 109037569 A | 12/2018 |
| CN | 109760846 A | 5/2019 |
| CN | 209382294 U | 9/2019 |
| CN | 110667870 A | 1/2020 |
| CN | 110911625 A | 3/2020 |
| CN | 213340646 U | 6/2021 |
| EP | 3561908 A1 | 10/2019 |

(56) References Cited

FOREIGN PATENT DOCUMENTS

| WO | 2013052178 A2 | 4/2013 |
| --- | --- | --- |
| WO | 2019151947 A1 | 8/2019 |
| WO | 2021201446 A1 | 10/2021 |
| WO | 2021206426 A1 | 10/2021 |

OTHER PUBLICATIONS

CNIPA, Office Action issued for Chinese Application No. 201910968766.1, mailed Aug. 29, 2022 (8 pages).
Qi, Yongsheng et al. "Pose Estimation Method of Rotor UAV Based on Visual Mark Detection" vol. 50, Phase 6, No. 28-40, 139 Page, Issue date Jun. 2019.
Ryu Miura et al., Wireless Personal Communications, "Preliminary flight test program on telecom andbroadcasting using high altitude platform stations" No. 341-361 Page, Issue date 2003.
European Search Report, European Application No. 22829535.8, mailed Mar. 7, 2024 (6 pages).

\* cited by examiner

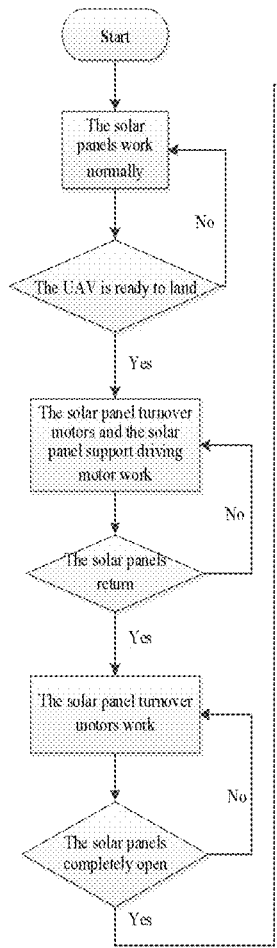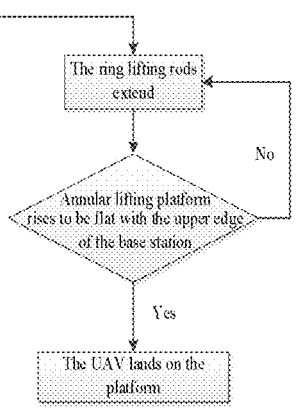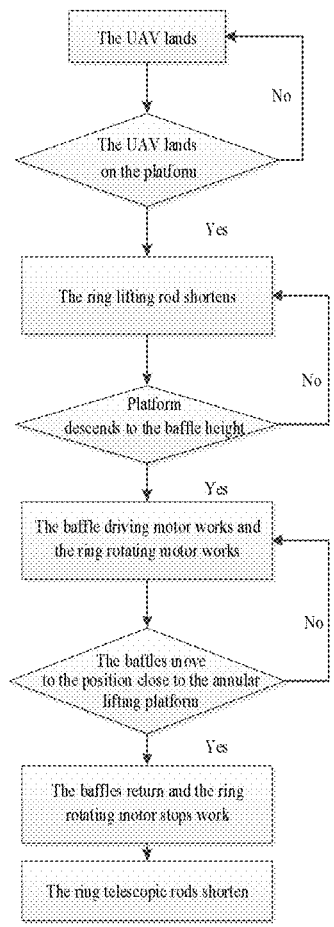
Figure 8a                                      Figure 8b

ENERGY SELF-CONTROL BASE STATION FOR BATTERY REPLACEMENT BASED ON SOLAR POWER SUPPLY WITH INDEPENDENT UAV TAKE-OFF AND LANDING

TECHNICAL FIELD

The invention relates to an energy self-control base station for battery replacement based on solar power supply with independent UAV take-off and landing, which belongs to the technical field of UAV control.

BACKGROUND ART

With the increasing maturity of control technology in recent years, UAV is widely used in various fields and plays an important role in today's society. UAV can be equipped with the image transmission device, data transmission device, GPS navigation system, ultrasonic monitoring device and other modules. Therefore, UAV meets most of application needs, such as power inspection, agriculture and forestry protection and other fields, and can even be used as a vehicle, exploration and patrol tool. However, limited by lift force and body weight of rotor UAV, the battery capacity of rotor UAV is limited. UAV generally has a short endurance time of about 30 minutes, which requires the staff to control the time and constantly replace the battery when the UAV is working. Under the current battery technology conditions, UAV is difficult to perform some tasks for a long time without the participation of staff, such as high-voltage line inspection, fire fighting and disaster resistance. Due to the sparsely populated and rugged terrains in Inner Mongolia, Xinjiang and other provinces and cities in China, staff's following the UAV to complete the task will cause a lot of waste of human resources. Therefore, it is urgent to provide an energy self-control base station that can enable the UAV to take off and land independently, and automatically replace the batteries, so as to ensure that the UAV can maintain good endurance during the mission, and the base station does not need to be connected to any external power supply to supply energy sources by means of energy self-control. In this way, the rotor UAV returns to the base station and continues to perform the task after replacing the battery when the power level is lower than a certain value.

In the prior art, the main problem of replacing UAV batteries in China is that the process of manually replacing UAV batteries will lead to a large waste of human resources, while some existing automatic battery replacement devices are complex, need high precision and cost too much. Therefore, how to replace the UAV batteries to enhance the endurance of UAV is the primary problem to be solved. The energy self-control base station for battery replacement based on solar power supply with automatic UAV take-off and landing is based on mechanical transmission technology and advanced control theory, which mainly solves the following problems:

1. The base station with automatic UAV take-off and landing shall be placed outdoors or even in some remote areas (when used for power inspection in grassland areas, the base station can be made into a relay inspection base station). Therefore, the base station needs a relatively high degree of automation, low failure rate and low maintenance cost. Thus, the base station shall be concise and practical, and the energy required for the work of the whole base station shall be solar energy for environment protection.
2. There is a large position deviation after the UAV lands, so a device that can adjust UAV position after landing is designed, which makes the UAV battery be replaced smoothly and automatically.
3. Traditionally, UAV batteries are replaced manually, and the staff need to follow the UAV for whole-process remote control, which consumes a lot of human resources and may damage the UAV during landing due to if the operator is not skillful. Therefore, the invention adopts a mechanical claw for replacing the batteries. After landing at the designated position, the UAV obtains sufficient power again in a short time by replacing the batteries, which ensures high UAV endurance during the task, and enables the UAV to complete the task without the participation of anyone in some rugged terrain areas. The invention has high levels of automation and intelligence.

With the advantages of simple structure, low cost, vertical takeoff and landing, good maneuverability, strong environmental adaptability, and the ability of carrying a variety of devices to complete corresponding tasks, UAV has been applied for more and more purposes in civil field. With the vigorous development of intelligent technology, microelectronics technology, digital communication technology, sensing technology and virtual reality technology, some original technical problems have been solved gradually, and the development of UAV technology is booming. However, UAV endurance has been always limited the flight distance and development of UAV. Therefore, the invention provides an energy self-control base station for battery replacement based on solar power supply with independent UAV take-off and landing, so as to solve the problem of insufficient UAV endurance.

At present, there are few reports on the base station for automatic take-off and landing of UAV, and the existing products can only realize the take-off, landing and recovery of UAV. The name of a similar patent (No. 2017306861263) is UAV base station, which adopts the transverse opening and closing of a single cover plate and has an internal lifting platform for completing the take-off, landing and recovery of the UAV, but the position of the UAV after landing cannot be adjusted. In case of any large deviation in the landing position, the UAV may be damaged when the platform is lowered. The function of the base station is relatively single and requires external power supply.

At present, some take-off and landing platforms for UAV are designed, but most of their mechanical structures are complex. There are few UAV lifting platforms designed in China. After retrieval, the patent named UAV take-off and landing platform (No. 2017217536570) uses an articulated and folding structure to lift the platform. The structure is complex and unstable. The failure of any part will make the platform unable to lift normally. Therefore, its maintenance cost is high. In addition, a certain deviation occurs when the UAV lands on the platform, so it is difficult to adjust the horizontal position of the UAV. For similar solutions, after retrieval, the patent named UAV take-off and landing platform (No. 2016109316653 and 2016109345783) adopt the following scheme: the vertical rod assembled at the bottom of the UAV is inserted into the funnel-shaped hole in the center of the lifting platform to align the UAV. This design can solve the deviation of the horizontal position when the UAV lands, but the design of the platform and the one of UAV are more complex. In particular, the device installed on the UAV will increase the weight of the UAV and occupy the already limited space on the UAV.

At present, some technologies can automatically replace UAV batteries through the mechanical structure, but high precision and complex mechanical structure are required. Moreover, the reports about automatic battery replacement of UAV are few in China. After retrieval, the patent named UAV battery replacement device and UAV battery automatic replacement method (announcement No. 1085058848, No. 201810062724) uses a manipulator to assist the battery in and out of the battery compartment. Compared with our invention, this patent has higher complexity, higher precision and greater difficulty in implementation. Due to more complex mechanical structure, it needs a higher process level, and its cost is higher. In addition, because the internal gear and motor of the manipulator are easy to deviate due to battery weight, long-term use may cause the batteries to not be smoothly fed into the battery compartment and damage the UAV.

To sum up, the base stations designed in the prior art have relatively single functions and can not supply energy independently. Therefore, their deployment is difficult in some remote areas, and they can neither complete the task of automatic battery replacement of UAV safely and stably, nor easily and quickly solve the endurance problem of UAV. Combined with the existing related inventions, according to the actual working conditions of the UAV and the actual requirements for the functions of the base station, the invention adopts a new idea to simplify the whole working process and improve the stability of the whole system, so as to ensure that the UAV batteries can be replaced without manual control.

First of all, in the existing inventions mentioned above, some base stations can only be used for the UAV to take off and land, but can not improve the endurance of UAV. Therefore, in terms of the functional design of the base station, in order to solve the short endurance time of the UAV, the base station in the invention is designed as an energy self-control base station that can be used for the UAV to take off and land and automatically change the battery; secondly, for the design of UAV take-off and landing platform, the structures of the above inventions are relatively complex, the UAV shall be specially refitted, and there will be a certain deviation when the UAV lands. If the position deviation of the UAV is large when the UAV lands on the platform, the UAV may collide with the base station when the platform descends, thus damaging the UAV. The invention has a lifting platform with an electric push rod driving a rotatable ring, which has simple structure and good stability. In addition, when the UAV lands on the ring, the electric baffles slowly approach the ring while the ring rotates, so as to make the UAV reach the redetermined position of the ring, eliminating the potential safety hazards caused by the position deviation of the UAV, and providing conditions for automatic battery replacement in the future; and finally, for the automatic battery replacement, the mechanical structures of the above inventions are relatively complex. Therefore, the invention adopts an electric gripper which moves only on one plane to grasp UAV batteries. After grasping the UAV batteries, the lifting platform descends to a certain height to separate the battery from the UAV. Then, the gripper moves directly above the battery box, the battery box rises, the gripper releases, the battery enters the box, and then the battery box descends to a certain height. After the gripper moves to the position of the new battery in the battery box, the battery box rises again, the gripper grabs the new battery and moves it to the UAV, and the lifting platform rises to load the new battery into the UAV. The battery replacement process can simplify the complexity of the mechanical structure of the device and better automatically replace UAV batteries.

Although the above existing UAV base stations, lifting platforms and automatic battery replacement technologies have been applied in corresponding application fields and realized certain functions, there are still some problems in the process of UAV landing, battery replacement and take-off.

1) Problems of Base Station Functions

The functions of the existing UAV base stations are relatively single, and most of them shall be operated by people to realize the recovery, battery replacement and release of UAV. When the UAV carries out power inspection and other tasks in fields of remote areas, relying too much on manual operation will greatly reduce the work efficiency of the UAV and consume a lot of human resources. Moreover, the manual operation of UAV is affected by the operator's skills and other factors. Improper operation may damage the UAV. Moreover, the existing base stations need external power supply to work normally. When the base station is set up in mountainous areas and other places inconvenient for power supply, the external power supply will also increase the use cost of the base station.

2) Problems of Platform Lifting after UAV Landing

Most of the existing UAV base stations directly descend the lifting platform after the UAV lands. The accuracy of UAV landing is affected by its own software and hardware and environment. There is more or less deviation between the UAV position and the predetermined position. Directly descending the UAV take-off and landing platform without adjusting the UAV position may make the UAV scratch or collide with other parts of the base station and then cause 3) Complex Process of Battery Replacement Device of UAV Most existing UAVs require manual battery replacement after recovery. The automatic battery replacement device with a manipulator is generally complex and expensive. After the UAV lands, multiple procedures are required to replace UAV batteries. At the same time, due to the complex mechanical structure, after the UAV lands, it may collide with the battery replacement device due to the impact during landing, which may destruct the internal structure of the automatic battery replacement device of UAV.

Content

In view of the above problems and according to the working environment of the base station and the particularity of the automatic battery replacement device of UAV, the invention fundamentally ensures the stability of the UAV in the process of landing, battery replacement and takeoff through a mechanical structure and control means, as follows:

For the problems of base station functions: most of the existing base stations are functionally unable to complete the automatic take-off and landing of UAV or replace the batteries, or require excessive manual operation in this process. In view of these problems, the invention designs an automatic base station that can automatically complete this task, which is equipped with an electric gripper for automatic battery replacement, a lifting battery box, electric baffles used to adjust the position of the UAV after landing and the annular UAV lifting platform, so as to complete the predetermined task simply and effectively. In some environments, it is inconvenient for the base stations for UAV take-off and landing to use external power supply, for example, for power inspection, most of the areas where the high-voltage line passes through are remote, and the external power supply to the base station will greatly increase the cost. For the energy supply of the base station, the invention designs foldable solar panels on the top of the base station to save the external power supply, so that the base station can adapt to the remote environment, effectively reduce the cost, save energy and protect the environment.

For the problems of lifting platform design: the lifting platform is one of the important facilities in the base station, and must ensure high reliability and low failure rate in practical application. Therefore, a complex structure doesn't meet the requirements. The lifting platform in the invention adopts three telescopic rods to jack up the annular platform, which has simple structure, and the top ring of the platform rotates so as to cooperate with the electric baffles to adjust the position of the UAV after landing.

For the problems of horizontal position adjustment of UAV after landing: due to certain deviation of UAV landing, direct lifting with the lifting platform may make the UAV scratch and collide with other parts in the base station and damage the UAV. Therefore, the position of UAV shall be adjusted after landing. The existing schemes or structures are complex, or occupy the limited load of UAV. In the invention, two baffles are installed in the base station, which rotate and cooperate with the top layer of the platform to adjust the UAV to a predetermined position, which ensures that the UAV is not damaged during the lifting process of the platform.

For the problem of complex process of the UAV battery replacement device: since certain space is required during the take-off and landing of UAV, the collision between the automatic battery replacement device and the UAV during the take-off and landing of UAV may damage the device. Therefore, the invention adopts a lead screw control method which increases the flexibility of mechanical claw and effectively avoids the unnecessary collision between the automatic charging device and the UAV, thus, no damage to the whole system is ensured. The lead screw control also improves the accuracy of the gripper for grasping and laying down the batteries, making the whole process more stable.

For battery replacement with automatic UAV take-off and landing, the invention adopts the technical scheme of an energy self-control base station for battery replacement based on solar power supply with independent UAV take-off and landing, which comprises a UAV take-off and landing device, an automatic battery replacement device and an energy supply device The UAV take-off and landing device is composed of electric baffles and an annular lifting platform. The electric baffle device is composed of a baffle driving motor (1), a big synchronous wheel synchronous belt (2), an optical axis bearing seat (3), an optical axis fixed seat (4), a big synchronous wheel (5), small synchronous wheels (6), forward Y-axis driving pieces (7), reverse Y-axis driving pieces (8), baffles (9) and optical axes (10). The baffle driving motor (1) and four optical axes (10) are fixed on the base station frame;

Two of the four optical axes (10), which are vertically arranged in parallel, are used as the driving optical axes, and the other two are horizontally arranged in parallel as the sliding track of the baffles (9). The two optical axes (10) as the sliding track of the baffles (9) are respectively provided with a forward Y-axis transmission piece (7) and a reverse Y-axis transmission piece (8), and both ends of the two baffles (9) are respectively fixed on the two forward Y-axis transmission pieces (7) and two reverse Y-axis transmission pieces (8);

The baffle driving motor (1) is connected with the big synchronous wheel (5) through the big synchronous wheel synchronous belt (2), the big synchronous wheel (5) is fixed on one of the driving optical axes, which is fixed on the base station frame through the optical axis bearing seat (3), so that the baffle driving motor (1) can drive the whole driving optical axis. Both ends of the driving optical axis where the big synchronous wheel (5) is located are respectively provided with one small synchronous wheel (6) which is respectively connected with two small synchronous wheels (6) on the other driving optical axis through the large synchronous wheel synchronous belt (2), two forward Y-axis transmission pieces (7) are fixed on the upper layer of the big synchronous wheel synchronous belt (2), and two reverse Y-axis transmission pieces (8) are fixed on the lower layer of the big synchronous wheel synchronous belt (2), making the two baffles (9) move relative or opposite at the same time;

The annular lifting platform is composed of an upper rotating ring (11), an upper rotating ring groove (12), a ring rotating motor (13) and a ring lifting rod (14). The upper rotating ring (11) is embedded in the upper rotating ring groove (12), and driven to rotate by the ring rotating motor (13). The ring lifting rod (14) is made of an electric push rod, and lifts the annular lifting platform;

The automatic battery replacement device is composed of an electric gripper, an electric gripper module and a liftable battery compartment. The electric gripper and the electric gripper module are composed of three module linear guide rails (15) and an electric mechanical claw (16). The module linear guide rails (15) are in an electric lead screw structure inside, which makes accurate movement of components on the guide rails. Two module linear guides (15) are fixed on the base station frame, and the two ends of another module linear guide (15) are respectively fixed on the two module linear guides (15) to realize the movement on the Y-axis. The electric mechanical claw (16) is fixed on the movable linear guide rails of the module to realize the movement on the X-axis. The lower part of the electric mechanical claw (16) changes the opening and closing degree through control, so as to grasp and place the batteries of the UAV;

The liftable battery compartment is composed of battery compartments (17) that can accommodate three batteries and a battery box lifting rod (18), wherein, the battery compartments (17) contains charged batteries. The batteries can be charged when the electric mechanical claw (16) takes off the batteries on the UAV and puts them into the battery box. At the same time, the electric mechanical claw (16) can directly take away the charged batteries and install them on the UAV. The liftable battery compartment is lifted by the battery box lifting rod (18);

The energy supply device is composed of a foldable solar panel and batteries (23), wherein, the foldable solar panel is composed of solar panel turnover motors (19), two solar panels (20), a solar panel support (21) and a solar panel support driving motor (22). One side of the solar panel support (21) is connected with the base station frame. The solar panel support driving motor (22) is installed at one end of the solar panel support (21) connected with the base station frame. The solar panel support driving motor (22) opens and closes the whole solar panel support (21) on the base station frame. One side of each of the two solar panels (20) is connected with the solar panel support (21). There is one solar panel turnover motor (19) on the connection side respectively. When UAV battery replacement is not required, the solar panels (20) turn over, and the solar panel support (21) changes the opening and closing angle to make full use of solar energy to get more electric energy. The batteries (23) are placed in the base station to store the electric energy generated by the solar panels.

Compared with the prior art, the invention has the following technical effects: the energy supply structure of the foldable solar panels, the position adjustment structure of UAV and the automatic battery replacement structure of the invention are original.

The foldable solar panel structure is driven by motors, and absorbs the solar energy to the greatest extent when there is no UAV landing or taking off for battery replacement, and charge the batteries as fast as possible, so as to ensure the power supply of the whole base station. Due to independent energy supply, the base station of the invention adapts to the environment inconvenient to be powered in remote areas and can effectively save cost.

UAV position adjustment structure: the invention designs a structure, in which electric baffles with a certain radian are combined with a rotatable annular lifting platform to adjust the UAV position. The invention has simple structure and is convenient for automatic battery replacement. The UAV damage caused by UAV position deviation is effectively avoided when the platform descends.

Automatic battery replacement structure: the invention adopts an electric mechanical claw to cooperate with a liftable battery compartment, so as to automatically replace UAV batteries. The battery compartment and the annular lifting platform can be lifted and lowered, and the purpose can be achieved by moving the electric mechanical claw on one plane. After the electric mechanical claw is aligned with the predetermined position, the batteries can be grasped and placed by lifting the battery compartment or the annular lifting platform, which simplifies the mechanical structure of the automatic battery replacement device.

BRIEF DESCRIPTION OF THE DRAWINGS

FIG. 8a Flow chart of UAV landing.
FIG. 8b Flow chart of UAV position adjustment.

Figure 1A:
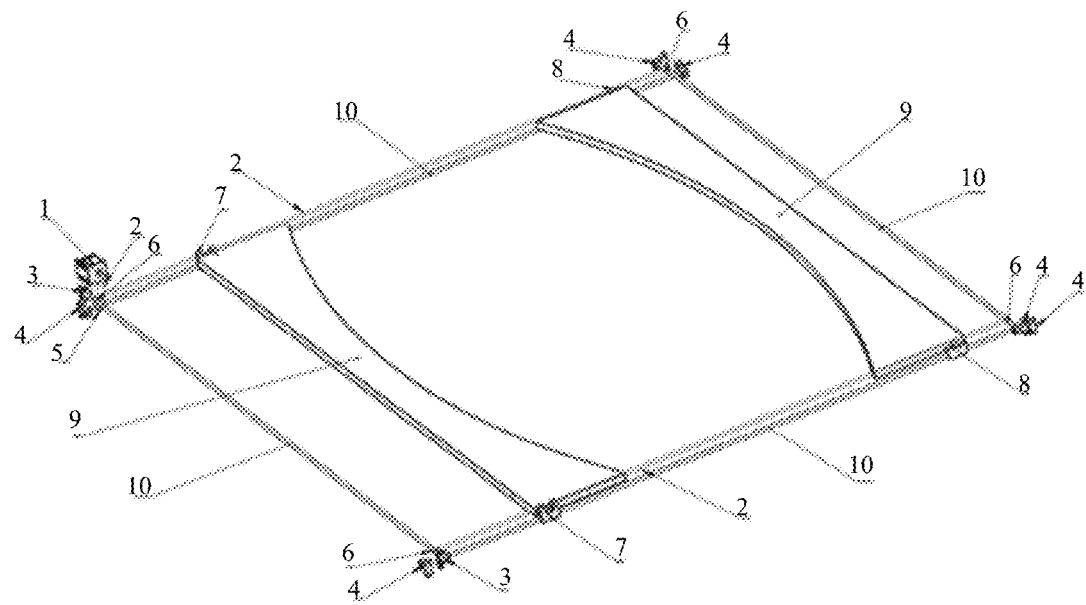
FIG. 1a Overall 3D view of the electric baffle device.
Figure 1B:
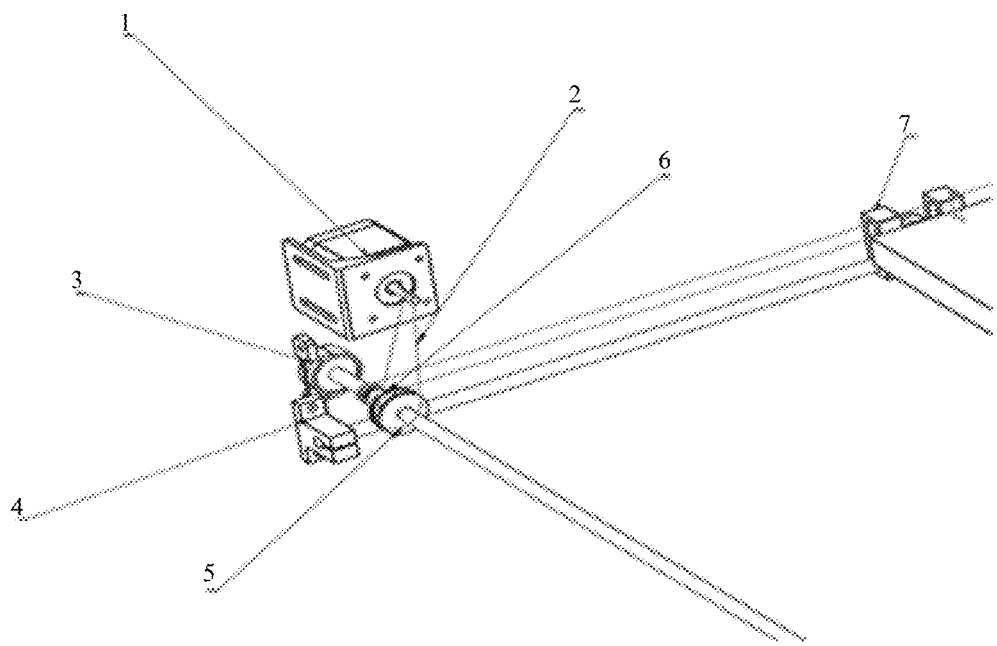
FIG. 1b Partial 3D view of key parts of the electric baffle device.
Figure 2:
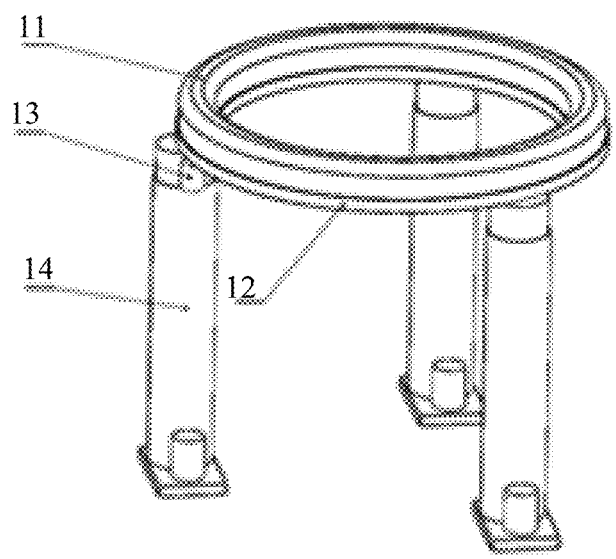
FIG. 2 Overall 3D view of annular lifting platform.
Figure 3:
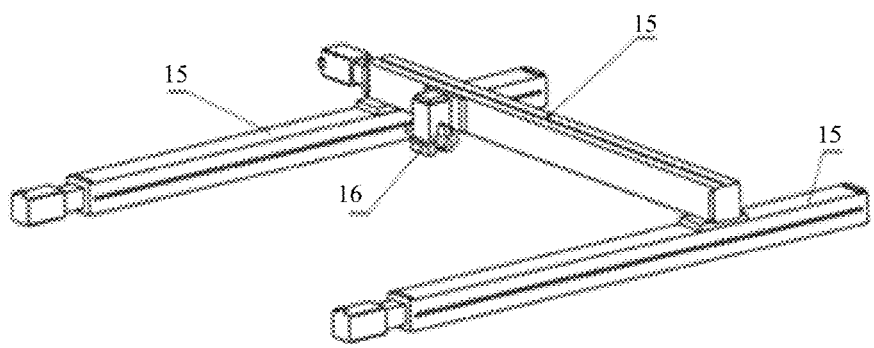
FIG. 3 Overall 3D view of electric gripper and electric gripper module.
Figure 4:
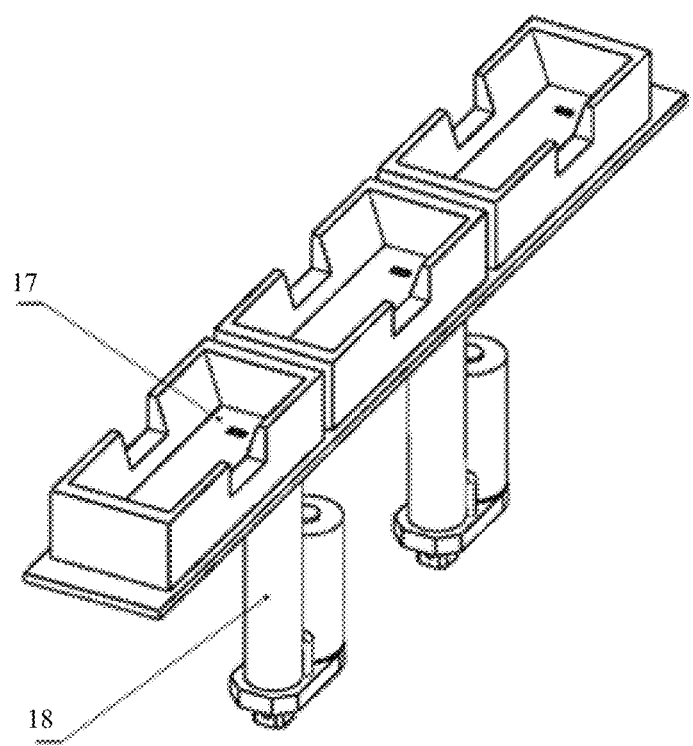
FIG. 4 Overall 3D view of the liftable battery box.
Figure 5A:
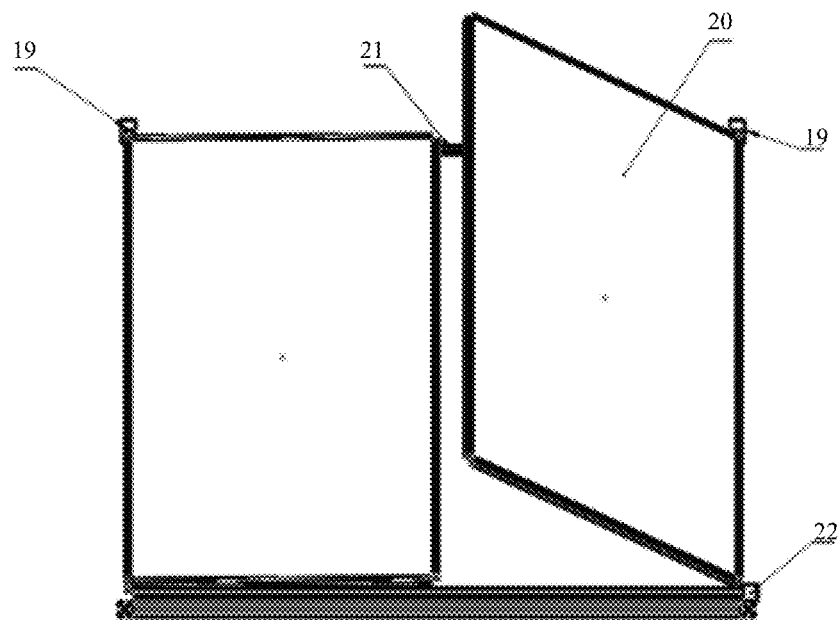
FIG. 5a Overall 3D view of the main view of the foldable solar panel.
Figure 5B:
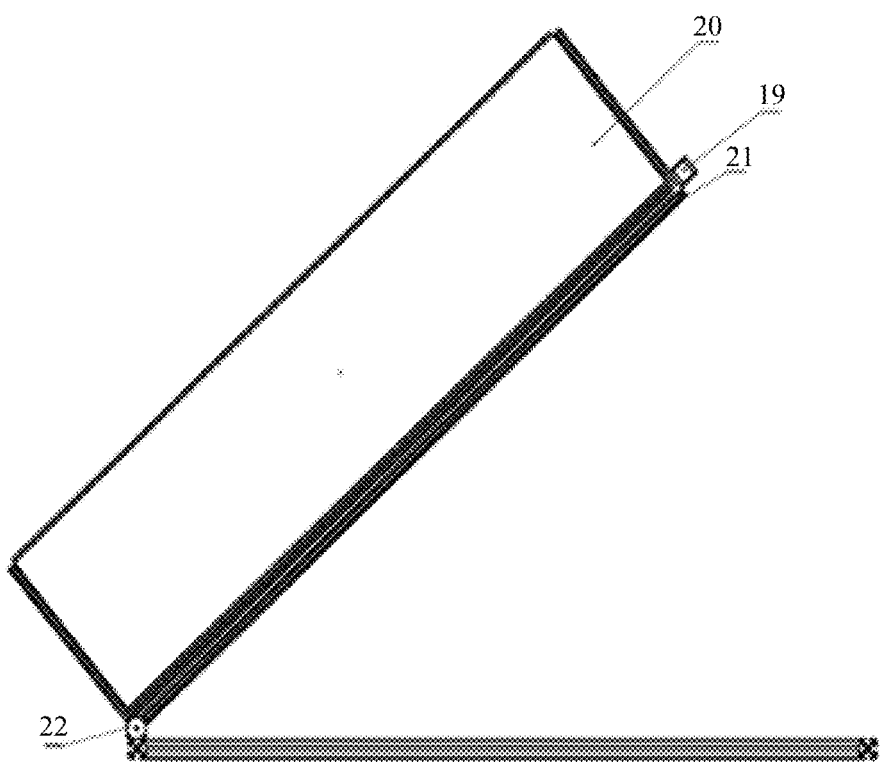
FIG. 5b Overall 3D view of side view of foldable solar panel.
Figure 6:
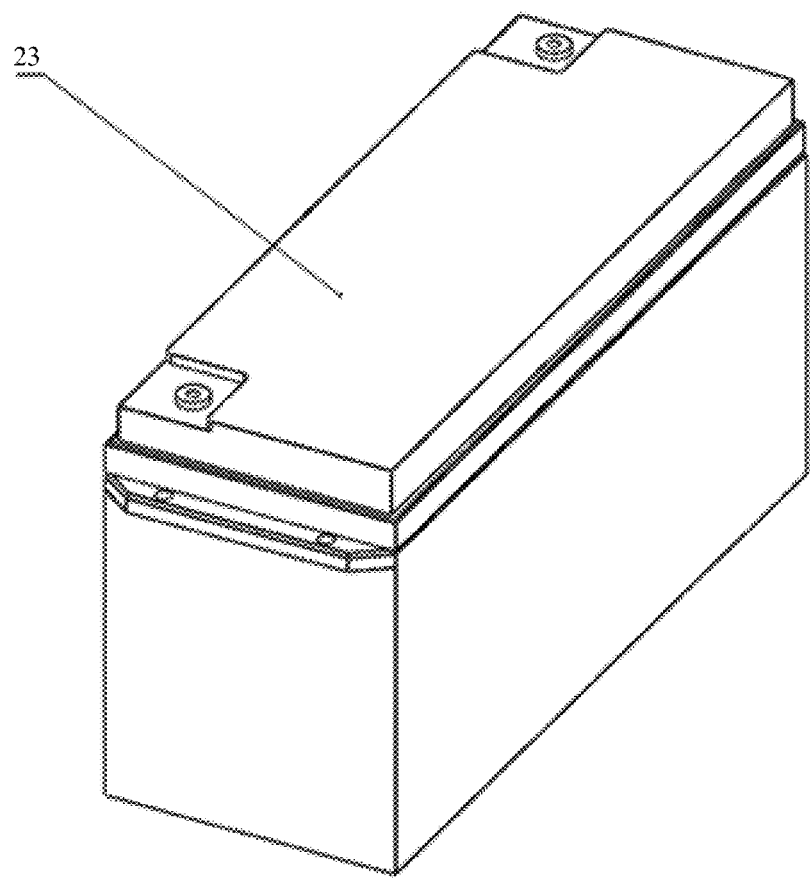
FIG. 6 Overall 3D view of battery.

In the figure: 1. baffle driving motor 2. synchronous belt 3. optical axis bearing seat 4. optical axis fixed seat 5. big synchronous wheel 6. small synchronous wheel 7. forward Y-axis driving piece 8. reverse Y-axis driving piece 9. baffle 10. optical axis 11. upper rotating ring 12. upper rotating ring groove 13. ring rotating motor 14. ring lifting rod 15. module linear guide rail 16. electric mechanical claw 17. battery compartment 18. lifting rod of battery compartment 19. solar panel turnover motor 20. solar panel 21. solar panel support 22. solar panel support driving motor 23. battery 24. solar panel top cover 25. electric gripper and its module 26. annular lifting platform 27. liftable battery compartment 28. battery 29. electric baffle device.

DETAILED DESCRIPTION OF PREFERRED EMBODIMENTS

The invention is described in detail below in conjunction with the drawings and embodiments.

When the UAV is about to land, the solar panels on the top of the base station open and the annular lifting platform rises to a predetermined height; after the UAV lands on the annular lifting platform, the annular lifting platform descends to the predetermined position, the upper rotating ring rotates, the baffles gradually moves from both sides to the middle, contact with the UAV tripod, and gradually push the UAV to the predetermined position; after the UAV reaches the predetermined position, the baffles return to both sides, and the annular lifting platform continues to descend to the height required for battery replacement; the electric mechanical claw moves to the predetermined position, and the annular lifting platform rises until the electric mechanical claw contacts the UAV battery; the electric mechanical claw contracts to grasp the battery, and the annular lifting platform descends to separate the battery from the UAV; the gripper moves to the position above the corresponding battery compartment which then rises, and the electric mechanical claw puts the battery into the battery compartment; then the battery compartment descends, the electric mechanical claw moves to the position above the new battery, the battery compartment rises, the gripper grabs the new battery, and the battery compartment descends; the electric mechanical claw moves to the position above the UAV, the annular lifting platform rises, and the annular lifting platform descends after the battery is loaded into the UAV; and the electric mechanical claw returns, the annular lifting platform rises to the take-off height of the UAV, and the UAV takes off.

Figure 7:
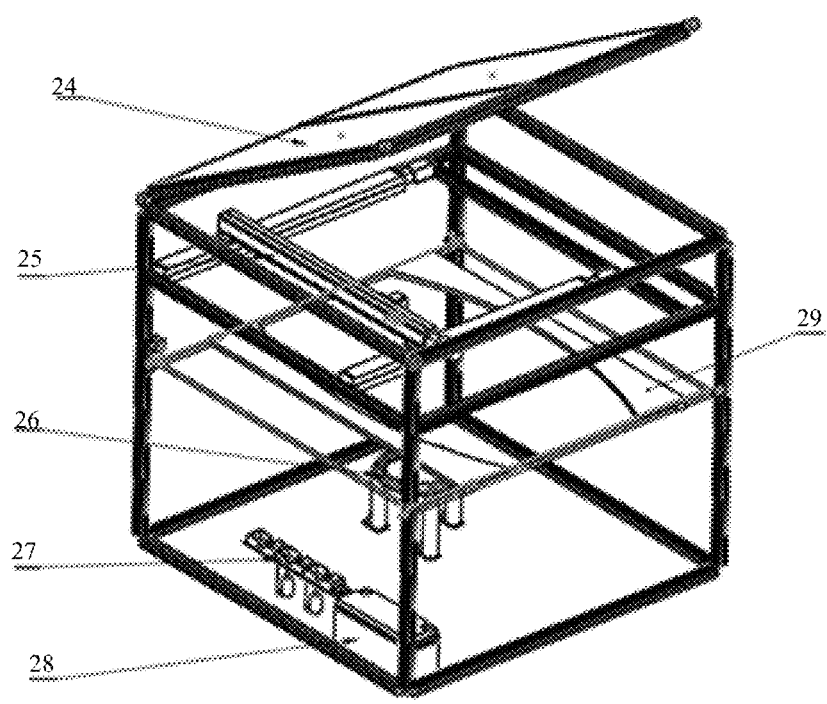
FIG. 7 Overall 3D view of the base station for battery replacement with automatic UAV take-off and landing.

The base station for battery replacement with automatic UAV take-off and landing is shown in FIG. 7.

Step 1: before the UAV lands, the solar panel turnover motors and the solar panel support driving motor return the solar panels; then, the solar panel turnover motors drive the solar panels to turn over 180 degrees to fully open; the ring lifting rod pushes the annular lifting platform to be flat with the upper edge of the base station, so that the UAV can land;

Step 2: after the UAV lands on the annular lifting platform, the platform descends to a height that makes the UAV's tripod be flat with the baffles; then, the ring rotating motor drives the upper rotating ring to rotate, and the baffle driving motor drives the baffles to move slowly to the annular lifting platform; when the UAV tripod contacts the baffles, with the rotation of the upper rotating ring and the gradual advancement of the baffles, the baffle with large radian gradually adjusts the position of the UAV; the edge arc of the baffle moving to the predetermined position adjusts the UAV to the ideal position to facilitate the subsequent battery replacement; and after adjustment, the baffles return to the original positions, and then the UAV position is ready;

Step 3: the annular lifting platform descends to the height required for battery replacement, and then the electric mechanical claw moves to the position above the UAV; the annular lifting platform rises to the predetermined position of the UAV battery, and stops rising within the height range of the electric mechanical claw, and the electric mechanical claw contracts to grasp the UAV battery; the annular lifting platform descends to separate the battery from the UAV; the electric mechanical claw moves to the position above the empty battery compartment, and then the lifting rod of the battery compartment pushes the battery compartment to rise until the battery is fully put into the compartment, the electric mechanical claw releases the battery, the replaced battery is charged in the battery compartment for the next task, and then the battery compartment drops; when the battery compartment descends to a height that does not affect the movement of the electric mechanical claw, the electric mechanical claw moves to the position above the charged battery; then the battery compartment rises again to the height for the electric mechanical claw to grasp the battery, the electric mechanical claw grasps the battery, and then the battery compartment descends to the original position; the electric claw moves to the position above the UAV, the annular lifting platform rises until reaching the UAV predetermined position where the new battery enters, and the electric mechanical claw releases the battery; after the new battery is in place, the annular lifting platform descends to a height that does not affect the movement of the electric mechanical claw, so that the electric mechanical claw can return to origin; and after the electric mechanical claw returns, the annular lifting platform rises to the height flat with the upper edge of the base station frame, and the UAV can take off. So far, the automatic battery replacement is completed;

Step 4: after the UAV takes off, the annular lifting platform returns to origin; the solar panel motors drive the solar panels to turn over to normal working positions; then the solar panel turnover motors and the solar panel support driving motor return the solar panels to the efficient working state;

Due to the long working process of the base station, the whole process is divided into a UAV landing process, a UAV position adjustment process, an automatic battery replacement process, a UAV release and system reset process.

The flow chart of the base station for battery replacement with automatic UAV take-off and landing is shown in FIGS. 8a to 8d:

The UAV landing process is shown in FIG. 8a. When there is no UAV taking off or landing, the solar panels work normally and supply power to the batteries. When the UAV is ready to land, the solar panel turnover motors and the solar panel support driving motor drive the solar panels to return; the solar panel turnover motors drive the solar panels to fully open; the ring lifting rod extends and the annular lifting platform rises; and when the annular lifting platform rises to the position flat with the upper edge of the base station frame, the rising process ends, and the UAV can land on the platform.

The UAV position adjustment process is shown in FIG. 8b: after the UAV lands on the annular lifting platform, the ring lifting rod shortens and the platform descends to the height of the baffles; the ring lifting rod stops shortening, the baffle driving motor drives the two baffles to approach the annular lifting platform at the same time, and the ring rotating motor on the annular lifting platform drives the upper rotating ring to rotate; and when the baffles move close to the annular lifting platform, the ring rotating motor stops working and the upper rotating ring stops rotating. At the same time, the baffle driving motor reverses and drives the baffles to return. Then the UAV position adjustment process ends.

Figure 8C:
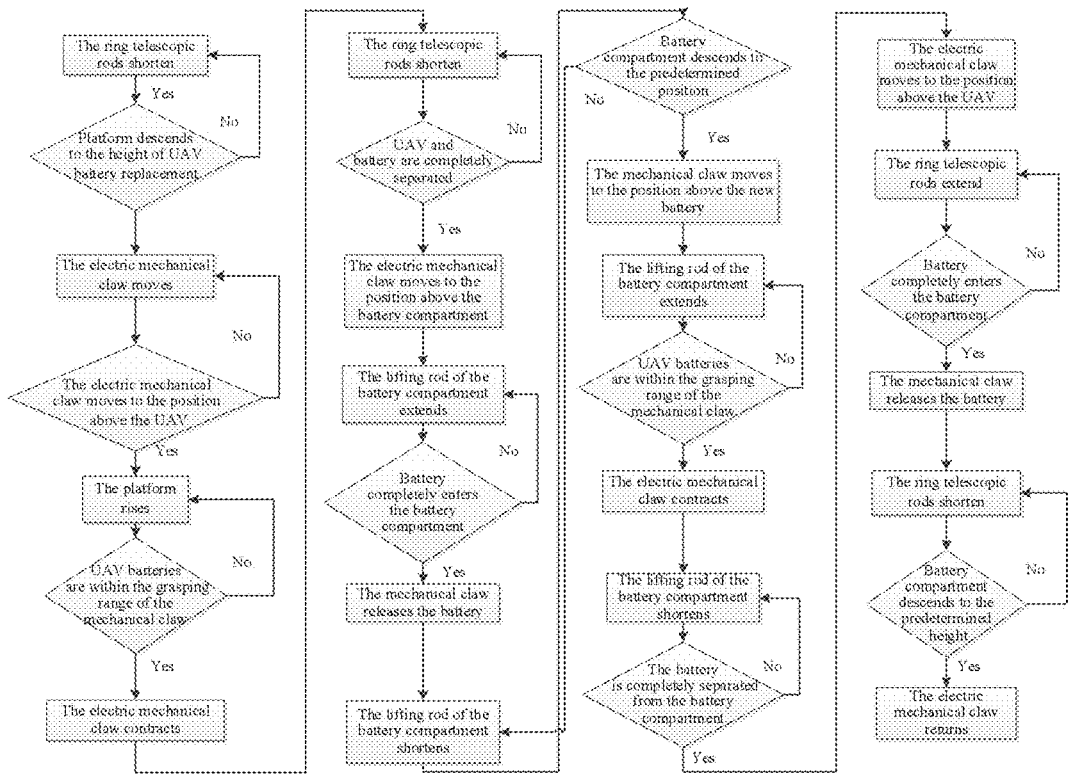
FIG. 8c Flow chart of automatic battery replacement.

The automatic battery replacement process is shown in FIG. 8c: the annular lifting platform descends to the height for UAV battery replacement, the electric mechanical claw starts to move to the position above the UAV battery compartment; the annular lifting platform rises to the height where the UAV battery can be grasped by the electric mechanical claw, the electric mechanical claw grasps the battery, and then the ring telescopic rods shorten to drive the annular lifting platform to descend; after the annular lifting platform descends to the position where the battery is completely separated from the UAV, the electric mechanical claw moves to the position above the lifting battery compartment with the grabbed battery, and the lifting rod of the battery compartment extends to raise the battery compartment; the battery completely enters the battery compartment, the electric mechanical claw releases the battery, and the lifting rod of the battery compartment shortens; the battery compartment descends to a predetermined height, the electric mechanical claw moves to the position above the new battery, the lifting rod of the battery compartment extends, and the battery compartment rises again; the battery compartment rises until the new battery can be grasped by the electric mechanical claw, and the electric mechanical claw grabs the new battery; the lifting rod of the battery compartment shortens and the battery compartment descends to the original position; the electric mechanical claw moves to the position above the UAV battery compartment; after the electric mechanical claw is in place, the ring telescopic rods extend to drive the ring lifting platform to rise; the battery completely enters the battery compartment, the electric mechanical claw releases the battery, and the ring telescopic rods shorten; and the annular lifting platform descends to a predetermined height, the electric mechanical claw returns, and the automatic battery replacement process ends.

Figure 8D:
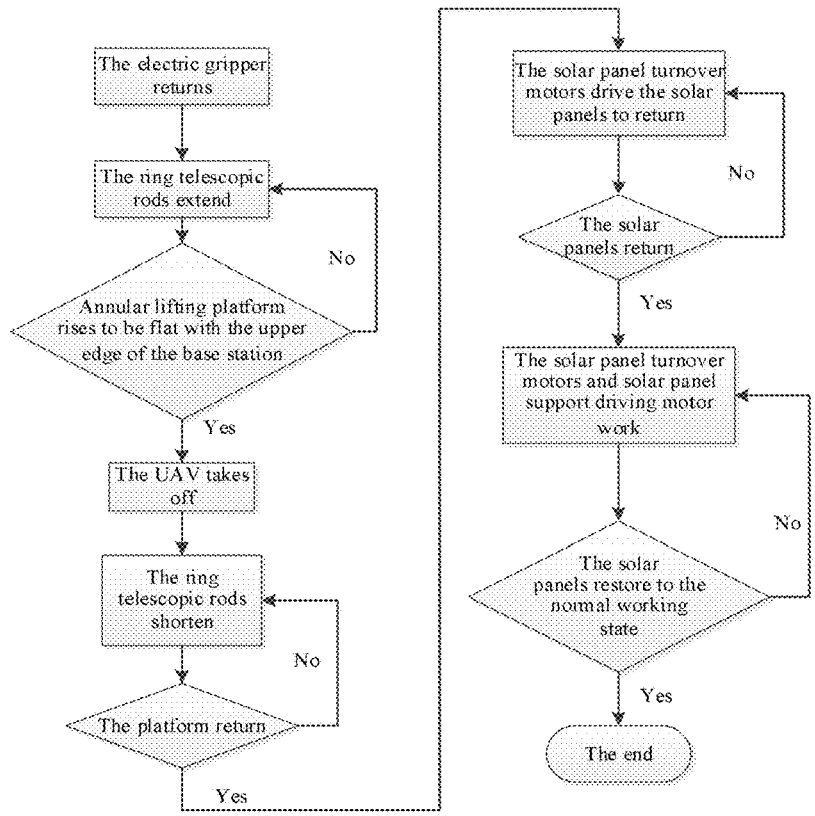
FIG. 8d Flow chart of UAV release and system reset.

The UAV release and system reset process is shown in FIG. 8d: the ring telescopic rods extend to drive the annular lifting platform to rise; after the annular lifting platform rises to the position flat with the upper edge of the base station frame, the UAV can take off; after the UAV takes off, the ring telescopic rods shorten to drive the annular lifting platform to return; the solar panel turnover motors drive the solar panels to return; and the solar panel turnover motors and the solar panel support driving motor start to restore the solar panels to their normal working state.

The invention claimed is:

1. An energy self-control base station for battery replacement based on solar power supply with independent UAV take-off and landing, comprising a UAV take-off and landing device, an automatic battery replacement device and an energy supply device;

The UAV take-off and landing device is composed of an electric baffle and an annular lifting platform; The electric baffle is composed of a baffle drive motor (1), a first synchronous wheel synchronous belt (2), an optical axis bearing seat (3), an optical axis fixed seat (4), a first synchronous wheel (5), second synchronous wheels (6), forward Y-axis driving pieces (7), reverse Y-axis driving pieces (8), baffles (9) and optical axes (10); The baffle driving motor (1) and four optical axes (10) are fixed on the base station frame;

Two of the four optical axes (10), which are vertically arranged in parallel, are used as the driving optical axes, and the other two are horizontally arranged in parallel as a sliding track of the baffles (9); The two optical axes (10) as the sliding track of the baffles (9) are respectively provided with a forward Y-axis transmission piece (7) and a reverse Y-axis transmission piece (8), and both ends of the two baffles (9) are respectively fixed on the two forward Y-axis transmission pieces (7) and two reverse Y-axis transmission pieces (8);

The baffle driving motor (1) is connected with the first synchronous wheel (5) through the first synchronous wheel synchronous belt (2), the first synchronous wheel (5) is fixed on one of the driving optical axes, which is fixed on the base station frame through the optical axis bearing seat (3), so that the baffle driving motor (1) drives the whole driving optical axis; Both ends of the driving optical axis where the first synchronous wheel (5) is located are respectively provided with one second synchronous wheel (6) which is respectively connected with two second synchronous wheels (6) on the other driving optical axis through the large synchronous wheel synchronous belt (2), two forward Y-axis transmission pieces (7) are fixed on an upper layer of the first synchronous wheel synchronous belt (2), and two reverse Y-axis transmission pieces (8) are fixed on a lower layer of the big first synchronous wheel synchronous belt (2), making the two baffles (9) move relative or opposite at the same time;

The annular lifting platform is composed of an upper rotating ring (11), an upper rotating ring groove (12), a ring rotating motor (13) and a ring lifting rod (14); The upper rotating ring (11) is embedded in the upper rotating ring groove (12), and driven to rotate by the ring rotating motor (13); The ring lifting rod (14) is made of an electric push rod, and lifts the annular lifting platform;

The automatic battery replacement device is composed of an electric gripper, an electric gripper module and a liftable battery compartment; The electric gripper and the electric gripper module are composed of three module linear guide rails (15) and an electric mechanical claw (16); The module linear guide rails (15) are in an electric lead screw structure inside, which makes movement of components on the guide rails; Two module linear guides (15) are fixed on the base station frame, and the two ends of another module linear guide (15) are respectively fixed on the two module linear guides (15) to realize the movement on the two module linear guides (15);

The electric mechanical claw (16) is fixed on the movable linear guide rails of the module to realize the movement on the the movable linear guide rails; The lower part of the electric mechanical claw (16) changes the opening and closing degree through control, so as to grasp and place the batteries of the UAV;

The liftable battery compartment is composed of battery compartments (17) that is configured to accommodate three batteries and a battery box lifting rod (18), wherein, the battery compartments (17) contains charged batteries; The batteries are charged when the electric mechanical claw (16) takes off the batteries on the UAV and puts batteries into the battery box; At the same time, the electric mechanical claw (16) directly takes away the charged batteries and install the charged batteries on the UAV; The liftable battery compartment is lifted by the battery box lifting rod (18);

The energy supply device is composed of a foldable solar panel and batteries (23), wherein, the foldable solar panel is composed of solar panel turnover motors (19), two solar panels (20), a solar panel support (21) and a solar panel support driving motor (22); One side of the solar panel support (21) is connected with the base station frame; The solar panel support driving motor (22) is installed at one end of the solar panel support (21) connected with the base station frame; The solar panel support driving motor (22) opens and closes the whole solar panel support (21) on the base station frame; One side of each of the two solar panels (20) is connected with the solar panel support (21); There is one solar panel turnover motor (19) is provided on the connection side respectively; When UAV battery replacement is not required, the solar panels (20) turn over, and the solar panel support (21) changes the opening and closing angle to make full use of solar energy to get more electric energy; The batteries (23) are placed in the base station to store the electric energy generated by the solar panels.

2. The energy self-control base station for battery replacement based on solar power supply with independent UAV take-off and landing according to claim 1, wherein, When the UAV lands, the solar panels on top of the base station open and the annular lifting platform rises to a predetermined height; after the UAV lands on the annular lifting platform, the annular lifting platform descends to the predetermined position, the upper rotating ring rotates, the baffles gradually moves from both sides to the middle, contact with the UAV tripod, and gradually push the UAV to the predetermined position; after the UAV reaches the predetermined position, the baffles return to both sides, and the annular lifting platform continues to descend to the height required for battery replacement; the electric mechanical claw moves to the predetermined position, and the annular lifting platform rises until the electric mechanical claw contacts the UAV battery; the electric mechanical claw contracts to grasp the battery, and the annular lifting platform descends to separate the battery from the UAV; the gripper moves to the position above the corresponding battery compartment which then rises, and the electric mechanical claw puts the battery into the battery compartment; then the battery compartment descends, the electric mechanical claw moves to the position above a new battery, the battery compartment rises, the gripper grabs the new battery, and the battery compartment descends; the electric mechanical claw moves to the position above the UAV, the annular lifting platform rises, and the annular lifting platform descends after the battery is loaded into the UAV; and the electric mechanical claw returns, the annular lifting platform rises to the take-off height of the UAV, and the UAV takes off.

3. The energy self-control base station for battery replacement based on solar power supply with independent UAV take-off and landing according to claim 1, wherein, The overall process of the base station for battery replacement with automatic UAV take-off and landing is as follows:

Step 1: before the UAV lands, the solar panel turnover motors and the solar panel support driving motor return the solar panels; then, the solar panel turnover motors drive the solar panels to turn over 180 degrees to fully open; the ring lifting rod pushes the annular lifting platform such that the annular lifting platform is flat with the upper edge of the base station;

Step 2: after the UAV lands on the annular lifting platform, the platform descends to a height that makes the UAV's tripod be flat with the baffles; then, the ring rotating motor drives the upper rotating ring to rotate, and the baffle driving motor drives the baffles to move slowly to the annular lifting platform; when the UAV tripod contacts the baffles, with the rotation of the upper rotating ring and the gradual advancement of the baffles, the baffle with large radian gradually adjusts the position of the UAV; the edge arc of the baffle moving to the predetermined position adjusts the UAV to the ideal position to facilitate the subsequent battery replacement; and after adjustment, the baffles return to original positions, and then the UAV position is ready;

Step 3: the annular lifting platform descends to the height required for battery replacement, and then the electric mechanical claw moves to the position above the UAV; the annular lifting platform rises to the predetermined position of the UAV battery, and stops rising within the height range of the electric mechanical claw, and the electric mechanical claw contracts to grasp the UAV battery; the annular lifting platform descends to separate the battery from the UAV; the electric mechanical claw moves to the position above the empty battery compartment, and then the lifting rod of the battery compartment pushes the battery compartment to rise until the battery is fully put into the compartment, the electric mechanical claw releases the battery, the replaced battery is charged in the battery compartment for the next task, and then the battery compartment drops; when the battery compartment descends to a height that does not affect the movement of the electric mechanical claw, the electric mechanical claw moves to the position above the charged battery; then the battery compartment rises again to the height for the electric mechanical claw to grasp the battery, the electric mechanical claw grasps the battery, and then the battery compartment descends to the original position; the electric claw moves to the position above the UAV, the annular lifting platform rises until reaching the UAV predetermined position where the new battery enters, and the electric mechanical claw releases the battery; after the new battery is in place, the annular lifting platform descends to a height that does not affect the movement of the electric mechanical claw, so that the electric mechanical claw returns to origin; and after the electric mechanical claw returns, the annular lifting platform rises to the height flat with the upper edge of the base station frame, and the UAV takes off; So far, the automatic battery replacement is completed;

Step 4: after the UAV takes off, the annular lifting platform returns to origin; the solar panel motors drive the solar panels to turn over to normal working positions; then the solar panel turnover motors and the solar panel support driving motor return the solar panels to the efficient working state;

Due to the long working process of the base station, the whole process is divided into a UAV landing process, a UAV position adjustment process, an automatic battery replacement process, a UAV release and system reset process.

4. The energy self-control base station for battery replacement based on solar power supply with independent UAV take-off and landing according to claim 3, wherein, The UAV landing process is as follows: when no UAV takes off or lands, the solar panels work normally and supply power to the batteries; When the UAV is ready to land, the solar panel turnover motors and the solar panel support driving motor drive the solar panels to return; the solar panel turnover motors drive the solar panels to fully open; the ring lifting rod extends and the annular lifting platform rises; and when the annular lifting platform rises to the position flat with the upper edge of the base station frame, the rising process ends, and the UAV lands on the platform.

5. The energy self-control base station for battery replacement based on solar power supply with independent UAV take-off and landing according to claim 3, wherein, the UAV position adjustment process is as follows: after the UAV lands on the annular lifting platform, the ring lifting rod shortens and the platform descends to the height of the baffles; the ring lifting rod stops shortening, the baffle driving motor drives the two baffles to approach the annular lifting platform at the same time, and the ring rotating motor on the annular lifting platform drives the upper rotating ring to rotate; and when the baffles move close to the annular lifting platform, the ring rotating motor stops working and the upper rotating ring stops rotating; At the same time, the baffle driving motor reverses and drives the baffles to return; Then the UAV position adjustment process ends.

6. The energy self-control base station for battery replacement based on solar power supply with independent UAV take-off and landing according to claim 3, wherein, the automatic battery replacement process is as follows: the annular lifting platform descends to the height for UAV battery replacement, the electric mechanical claw starts to move to the position above the UAV battery compartment; the annular lifting platform rises to the height where the UAV battery is grasped by the electric mechanical claw, the electric mechanical claw grasps the battery, and then the ring telescopic rods shorten to drive the annular lifting platform to descend; after the annular lifting platform descends to the position where the battery is completely separated from the UAV, the electric mechanical claw moves to the position above the lifting battery compartment with the grabbed battery, and the lifting rod of the battery compartment extends to raise the battery compartment; the battery completely enters the battery compartment, the electric mechanical claw releases the battery, and the lifting rod of the battery compartment shortens; the battery compartment descends to a predetermined height, the electric mechanical claw moves to the position above the new battery, the lifting rod of the battery compartment extends, and the battery compartment rises again; the battery compartment rises until the new battery is grasped by the electric mechanical claw, and the electric mechanical claw grabs the new battery; the lifting rod of the battery compartment shortens and the battery compartment descends to the original position; the electric mechanical claw moves to the position above the UAV battery compartment; after the electric mechanical claw is in place, the ring telescopic rods extend to drive the ring lifting platform to rise; the battery completely enters the battery compartment, the electric mechanical claw releases the battery, and the ring telescopic rods shorten; and the annular lifting platform descends to a predetermined height, the electric mechanical claw returns, and the automatic battery replacement process ends.

7. The energy self-control base station for battery replacement based on solar power supply with independent UAV take-off and landing according to claim 3, wherein, the UAV release and system reset process is as follows: the ring telescopic rods extend to drive the annular lifting platform to rise; after the annular lifting platform rises to the position flat with the upper edge of the base station frame, the UAV takes off, after the UAV takes off, the ring telescopic rods shorten to drive the annular lifting platform to return; the solar panel turnover motors drive the solar panels to return; and the solar panel turnover motors and the solar panel support driving motor start to restore the solar panels to a normal working state.

* * * * *